(12) United States Patent
Van Den Bossche

(10) Patent No.: US 12,244,351 B2
(45) Date of Patent: Mar. 4, 2025

(54) QUANTUM TELECOMMUNICATIONS NETWORK WITH A SPACEBORNE OR AIRBORNE COMPONENT

(71) Applicant: THALES, Courbevoie (FR)

(72) Inventor: Mathias Van Den Bossche, Goyrans (FR)

(73) Assignee: THALES, Courbevoie (FR)

( * ) Notice: Subject to any disclaimer, the term of this patent is extended or adjusted under 35 U.S.C. 154(b) by 133 days.

(21) Appl. No.: 17/990,303

(22) Filed: Nov. 18, 2022

(65) Prior Publication Data
US 2023/0163860 A1 May 25, 2023

(30) Foreign Application Priority Data

Nov. 22, 2021 (FR) ...................................... 2112323

(51) Int. Cl.
*H04B 10/70* (2013.01)
*H04B 10/118* (2013.01)
(52) U.S. Cl.
CPC ........... *H04B 10/70* (2013.01); *H04B 10/118* (2013.01)
(58) Field of Classification Search
None
See application file for complete search history.

(56) References Cited

U.S. PATENT DOCUMENTS

| 2010/0079833 | A1* | 4/2010 | Langford | G02F 1/3536 |
| | | | | 359/107 |
| 2011/0108744 | A1* | 5/2011 | Stevenson | B82Y 10/00 |
| | | | | 250/493.1 |
| 2016/0191173 | A1 | 6/2016 | Malaney | |
| 2021/0105135 | A1* | 4/2021 | Figueroa | H04B 10/70 |
| 2021/0175976 | A1* | 6/2021 | Rahman | H04B 10/70 |
| 2021/0232963 | A1* | 7/2021 | Gimeno-Segovia | G06N 10/40 |
| 2021/0304053 | A1* | 9/2021 | Pant | G06F 11/1004 |

FOREIGN PATENT DOCUMENTS

| CN | 111 817 791 A | 10/2020 |
| WO | 2021/016095 A1 | 1/2021 |
| WO | 2021/067631 A1 | 4/2021 |

OTHER PUBLICATIONS

Yong-Su Kim, "Informationally symmetrical Bell state preparation and measurement" Optics Express vol. 26, Issue 22, pp. 29539-29549 (2018) (https://opg.optica.org), (Year: 2018).*

(Continued)

*Primary Examiner* — Darren E Wolf
(74) *Attorney, Agent, or Firm* — BakerHostetler

(57) ABSTRACT

A quantum telecommunications network includes nodes, typically on the ground; a conventional telecommunications network connecting the nodes to one another; and at least one satellite or airborne carrier able to generate and transmit multiplets of entangled photons to the nodes. The nodes are configured to collect photons from the satellite, take joint quantum measurements and exchange conventional information with other nodes via the conventional telecommunications network. Node and satellite payload for such a quantum telecommunications network. Method for quantum telecommunications by way of such a network.

6 Claims, 4 Drawing Sheets

(56) References Cited

OTHER PUBLICATIONS

Tao Li, "Entanglement distillation for quantum communication network with atomic-ensemble memories", Optical Society of America, Oct. 6, 2014 | vol. 22, No. 20 | DOI: 10.1364/OE.22.023897 | Optics Express 23897 (Year: 2014).*
Pirandola, et al., "Advances In Quantum Teleportation", Nature Photonics, vol. 9, pp. 641-652, 2015.
Yin, et al., "Entanglement-based secure quantum cryptography over 1,120 kilometres", Nature, vol. 582, pp. 501-505, 2020.
Zhong et al., "Optically addressable nuclear spins in a solid with a six-hour coherence time", Nature, vol. 517, pp. 177-180, Jan. 8, 2015.
Bouwmeester, et al., "Experimental quantum teleportation", Nature, vol. 390, pp. 575-579, Dec. 11, 1997,.
Yang et al., "Experimental Synchronization of Independent Entangled Photon Sources", Phys. Rev. Lett., vol. 96, 110501, 2006.
Dréau et al., "Quantum frequency conversion to telecom of single photons from a nitrogen-vacancy center in diamond", arXiv:1801.03304v2 [quant-ph], Jun. 22, 2018.
Lago-Rivera, et al., "Telecom-heralded entanglement between multimode solid-state quantum memories", Nature, 2021, vol. 594, No. 7861, pp. 37-40, 2021.
Bennet, et al., "Mixed-state entanglement and quantum error correction", Phys. Rev. A, 54, 3824, 1996.
Kalb, et al., "Entanglement distillation between solid-state quantum network nodes", Science, 356, pp. 928-932 2017.
Yin, et al., "Satellite-based entanglement distribution over 1200 kilometers", Science, vol. 356, No. 6343, pp. 1140-1144, 2017.
Hosseinidehaj, et al., "Satellite-Based Continuous-Variable Quantum Communications: State-of-the-Art and a Predictive Outlook", IEEE Communications Surveys & Tutorials, vol. 21, Issue: 1, 2019.

\* cited by examiner

QUANTUM TELECOMMUNICATIONS NETWORK WITH A SPACEBORNE OR AIRBORNE COMPONENT

CROSS-REFERENCE TO RELATED APPLICATION

This application claims priority to foreign French patent application No. FR 2112323, filed on Nov. 22, 2021, the disclosure of which is incorporated by reference in its entirety.

FIELD OF THE INVENTION

The invention relates to the field of quantum information, and more particularly to quantum telecommunications networks. It aims to make it possible to create such networks having a wide geographical range, for example greater than 100 km.

BACKGROUND

A quantum telecommunications network (or simply communications network) makes it possible to transport quantum information between multiple quantum processors or sensors (terminal nodes) located at different locations. Such a network lends itself to various applications, such as quantum key distribution, synchronization, interferometry between remote sensors, distributed quantum computing, delegated quantum computing, or even high-throughput communication, etc. See for example US 2021/0175976.

At present, experiments are being carried out on quantum telecommunications networks in fibre-optic infrastructures within which quantum information is carried by photons (Lago-Rivera 2021). The optical fibre has a photon absorption rate that reduces the power of said photons by around $0.2 \text{ dB} \cdot \text{km}^{-1}$. Since, moreover, the no-cloning theorem from quantum physics does not allow the states of photons carrying the information to be replicated, this results in a limit on the range of these networks of the order of 100 km—see in this regard Pirandola 2015—even though quantum repeaters have been proposed for extending this range, see for example WO 2021/067631.

The invention aims to overcome this range limit and to allow the creation of quantum telecommunications networks able to extend over several hundreds or thousands of kilometres.

According to the invention, this aim is achieved using satellites to transmit pairs (more generally multiplets) of entangled photons to ground stations (although the use of airborne stations such as stratospheric probes or high-altitude drones is also conceivable) forming the nodes of a network. Entanglement distribution from satellites makes it possible to greatly limit losses since, under favourable atmospheric conditions, free-space propagation exhibits losses far lower than fibre-optic propagation. This has been demonstrated over distances greater than 1000 km—see Yin 2020. The entangled states are stored in quantum memories contained in the ground stations, thereby making it possible to at least partially bypass the problem of the intermittent nature of satellite links, given that the best available quantum memories have coherence times of several hours (Zhong 2015). Entanglement swapping operations between nodes sharing entangled states then make it possible to propagate the entanglement correlations to stations located beyond the area of common visibility of a satellite.

A first aspect of the invention is therefore the use of a satellite component in the architecture of a generic quantum telecommunications system. This system contains notably a quantum communication channel function (implemented by an optical system) for transporting quantum information, and a conventional communication channel function (based on cables, optical fibres, radio waves, etc.) for performing operations complementary to the quantum channel and more generally allowing management of the system. This architecture is oriented by managing the consumable and perishable resource, which is the entanglement between states of subsystems used for the quantum telecommunications.

A second aspect of the invention is the fact that the satellite provides a function of a source of entangled states to multiple subsystems, the members of which are distributed to terrestrial, spaceborne or airborne stations. These stations constitute elementary nodes of a quantum telecommunications network and provide an entanglement swapping function in order to create an entanglement relationship between elements further away than the members of the satellite-distributed multiplet. These node stations may also contain a function of distilling the entanglement received by a satellite in order to increase the level of entanglement of the available multiplets. Finally, these node stations may comprise a function that advertises, to the rest of the system, the receipt or the consumption of an entanglement resource. For this purpose, the entangled multiplet elements should be able to be identified in the system.

These nodes may furthermore serve as input point for fibre-based networks that distribute entanglement on a more local scale (agglomeration, etc.). This input/interface function takes place through entanglement swapping between satellite-distributed elements and fibre-distributed elements.

A third aspect of the invention is that the system may advantageously contain a function of storing the entangled-state components in one or more quantum memories while waiting to be consumed by a future entanglement swapping operation. Advantageously, the quantum memories are located in the node stations.

A fourth aspect of the invention is the fact that the system may advantageously comprise a function that catalogues the resource formed by the available entangled-state components. This cataloguing comprises notably the date of acquisition of the resource, its estimated remaining lifetime, its entanglement quality and the quality of the location of its one or more counterparts.

A fifth aspect of the invention is that the system may advantageously comprise a function that manages the perishable and consumable aspect of the entanglement resource, firstly by scheduling the satellite entanglement distribution operations, and secondly by optimizing the choice of the multiplets that are consumed in order to swap the entanglement over greater distances on the basis of parameters such as for example the age of the resource with respect to its decoherence time, the dates when it will be possible to recharge a node for geometric reasons, conditions regarding dazzle or conditions regarding meteorological interference with the node station.

SUMMARY OF THE INVENTION

One subject of the invention is therefore a quantum telecommunications network comprising:
- a plurality of at least three nodes, at least some of which are located on the ground;
- a conventional telecommunications network connecting said nodes to one another; and at least one source of multiplets of entangled photons and
an optical transmission system allowing the photons of
said multiplets to be transmitted to respective nodes of
said quantum telecommunications network;
wherein each said node comprises:
- an optical reception system for collecting photons originating from said or from one said source;
- a conventional network interface for exchanging conventional information with other quantum telecommunications network nodes; and
- a quantum circuit system configured to take a direct or indirect joint quantum measurement on the quantum states of at least two photons collected by the optical system projecting them onto a base of maximally entangled states and to transmit the result of the joint quantum measurement to other quantum telecommunications network nodes via the conventional network interface; characterized in that:
- said or at least one said source of multiplets of entangled photons is carried by a satellite or by an airborne carrier; and in that
- in at least one said node, said quantum circuit system comprises: —a quantum memory device comprising a plurality of quantum subsystems;
- a first quantum circuit configured to transfer a quantum state of a photon collected by the optical reception system to a quantum subsystem of the quantum memory device; and
- a second quantum circuit configured to take said joint quantum measurement on the quantum states of at least two quantum subsystems of the quantum memory device that are associated with respective photons.

According to some particular embodiments of such a quantum telecommunications network:

The quantum circuit system of at least one said node may also comprise a third quantum circuit configured to apply a quantum distillation algorithm to a plurality of quantum subsystems of the quantum memory device.

Said or each said node may also comprise a processor configured or programmed to verify a violation of Bell's inequalities by a series of said joint quantum measurements, so as to qualify the quality of the distributed entanglement.

The quantum circuit system of at least one said node may be configured to transmit the quantum state of a photon collected by the optical system or a quantum subsystem of the quantum memory device on a quantum channel.

The multiplets may be pairs of entangled photons.

The second quantum circuit of at least one said node may be configured to take a Bell measurement on the quantum states of two quantum subsystems of the quantum memory device, resulting in entanglement swapping between two other nodes of the network.

Another subject of the invention is a method for quantum telecommunications by way of such a network, comprising the following steps:
a) using said one or more satellites or airborne carriers to transmit multiplets of mutually entangled photons to various network nodes, such that the quantum entanglement links between pairs or multiplets of nodes form a sub-graph covering said network;
b) defining a starting node and an end node that are not directly connected by a quantum entanglement link and choosing one or more intermediate nodes such that the quantum entanglement links between these nodes form a path from the starting node to the end node;
c) using the quantum circuit systems of the intermediate nodes and the conventional telecommunications network to perform a succession of entanglement swapping operations between nodes so as to create a new quantum entanglement link between the starting node and the end node; and
d) using the quantum circuit systems of the starting node and end node and the conventional telecommunications network to transmit a quantum state of the starting node to the end node using said new quantum entanglement link.

Yet another subject of the invention is a quantum telecommunications network node comprising:
- an optical system for collecting photons;
- a conventional network interface for exchanging conventional information with other nodes of the quantum telecommunications network; and
- a quantum circuit system configured to take a direct or indirect joint quantum measurement on the quantum states of at least two photons collected by the optical system projecting them onto a base of maximally entangled states and to transmit the result of the joint quantum measurement to other quantum telecommunications network nodes via the conventional network interface; characterized in that:
- the optical system is configured to collect said photons from a satellite or an airborne carrier; and in that:
- the quantum telecommunications network node also comprises a quantum memory device comprising a plurality of quantum subsystems, said quantum circuit system comprising:
- a first quantum circuit configured to transfer a quantum state of a photon collected by the optical system to a quantum subsystem of the quantum memory device; and
- a second quantum circuit configured to take said joint quantum measurement on the quantum states of at least two quantum subsystems of the quantum memory device that are associated with respective photons.

DETAILED DESCRIPTION

Figure 1:
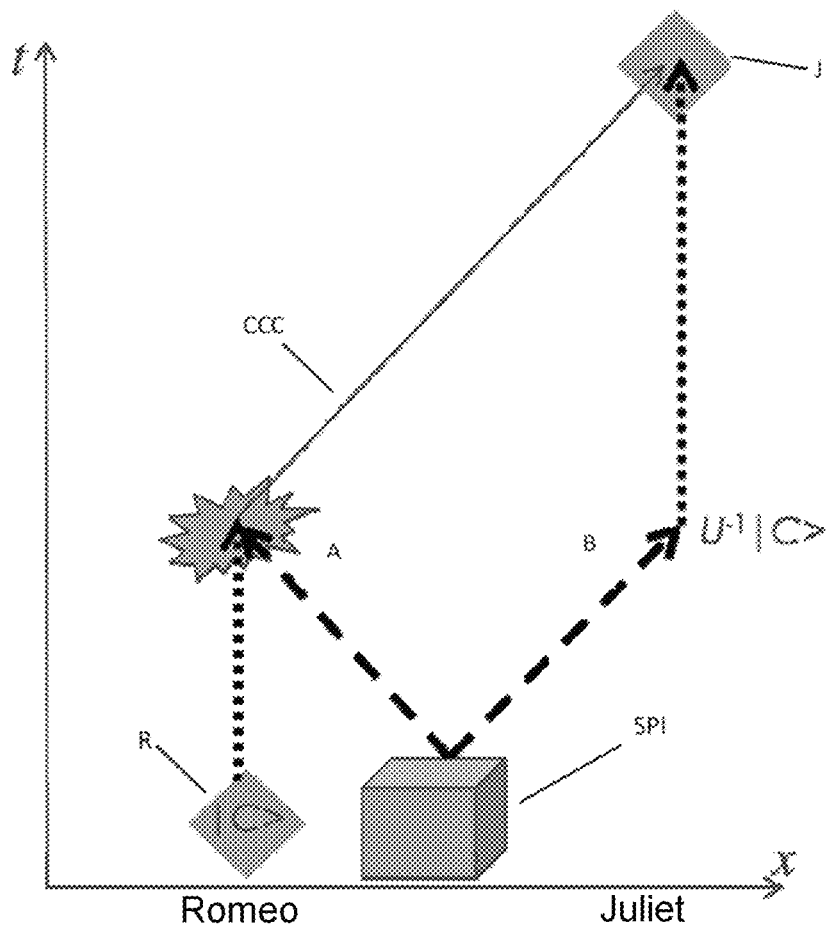
FIG. 1 illustrates the principle of the teleportation of quantum states.

The principle of the teleportation of quantum states is described in FIG. 1, where the horizontal axis (x) represents a spatial separation and the vertical axis (t) represents the passage of time.

A first quantum communications node, Romeo (R), has a qubit in the state |C> and wishes to send this state to a second node, Juliet (J). For the sake of simplicity, it will be considered that C is a system with two states $|C_+\rangle$, $|C_-\rangle$; there is therefore generally $|C\rangle = \alpha|C_+\rangle + \beta|C_-\rangle$ with $\alpha$, $\beta$ being complex and such that $\alpha^2 + \beta^2 = 1$.

To transmit the state $|C\rangle$—which is generally unknown—Romeo and Juliet have a quantum channel and a conventional channel CCC. The quantum channel is formed by way of a source of pairs of entangled particles SPI. The source SPI generates two photons (or other particles) A and B, which are in a maximally entangled state, for example:

$$|AB\rangle = (|A_+\rangle|B_-\rangle + |A_-\rangle|B_+\rangle)/\sqrt{2}$$

where $|A_+\rangle$, $|A_-\rangle$ are two orthogonal states (typically polarization states) of the photon A and $|B_+\rangle$, $|B_-\rangle$ are two orthogonal states (typically polarization states) of the photon B. Photon A is sent to Romeo, and photon B is sent to Juliet. The conventional channel CCC is a standard communication channel that allows a conventional information exchange.

To teleport the state of C to Juliet, Romeo carries out a joint measurement of the state of A and C (for example of their polarization). This is typically a Bell measurement that projects the system AC onto a Bell base.

A simple calculation demonstrates that this measurement will project the superposed state of AC onto one of its components, and the non-local character of the state of AB will mean that the state of B will also be projected into the state that C was in before the measurement, to within a unitary operation. This unitary operation depends on the result of the measurement of the state of AC that Romeo obtained. The conventional channel CCC is then used for Romeo to communicate to Juliet the result of the measurement that it obtained on AC. Juliet is thereby able to apply to B the unitary transformation $U^{-1}$ that corresponds to this result, and put B into the exact state that C was in: the state C has been teleported to Juliet.

One experimental exemplary implementation of quantum teleportation is described for example in Bouwmeester 1997.

Figure 2:
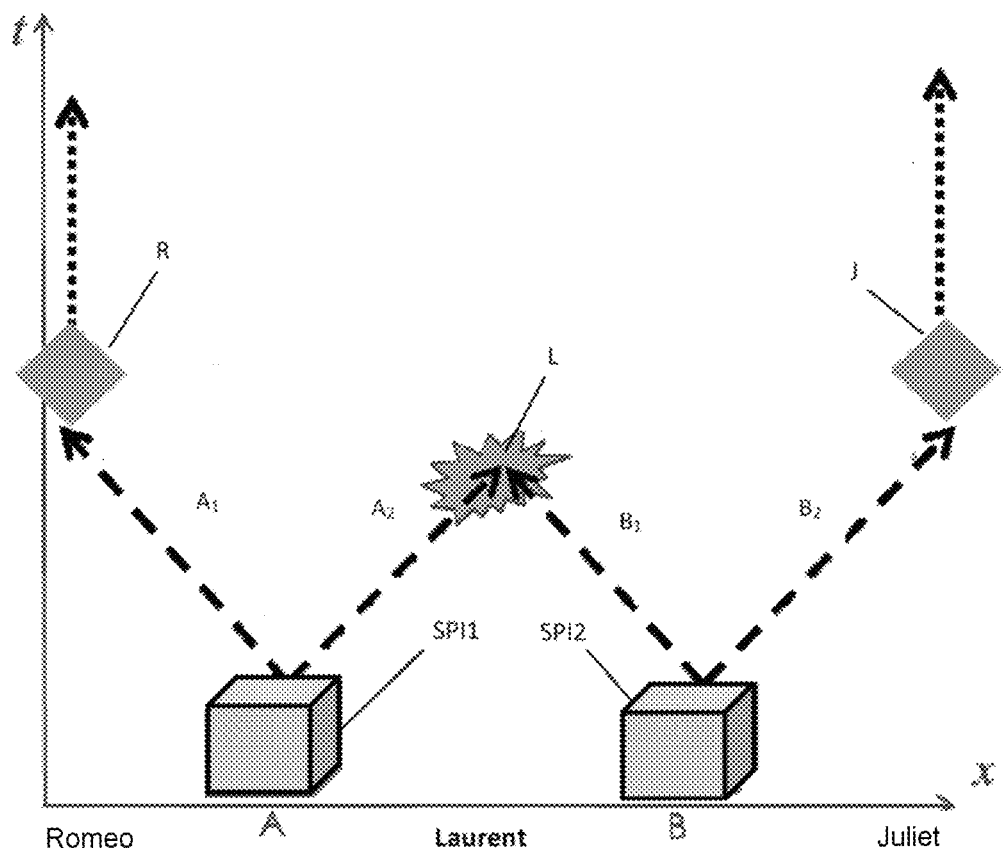
FIG. 2 illustrates the principle of entanglement swapping.

One extension of the principle of teleportation is the entanglement swapping process. Entanglement swapping makes it possible to create the entanglement between two remote subsystems that each participate in a quantum channel of the type used in a teleportation. This principle, illustrated by FIG. 2, is a basic element of the invention. Like in FIG. 1, in FIG. 2, the horizontal axis (x) represents a spatial separation and the vertical axis (t) represents the passage of time.

A first source of entangled pairs SPI1 establishes a first quantum channel between Romeo and an intermediate node Laurent (L) serving as an entanglement router by transmitting to them a first pair of entangled photons $A_1$, $A_2$. A second source of maximally entangled pairs SPI2 establishes a second quantum channel between Laurent and Juliet by transmitting to them a second pair of maximally entangled photons $B_1$, $B_2$. By taking a joint measurement of the state of the photons $A_2$, $B_1$ that it receives, Laurent deterministically projects the system $A_1B_2$ into an entangled state. Following the joint measurement taken by Laurent, Romeo and Juliet therefore have a quantum channel (that is to say a system of entangled particles) allowing them to teleport quantum states among one another, even though they do not share a source of entangled pairs as in the case of FIG. 1.

One specific implementation of entanglement swapping is described for example in Yang 2006.

The teleportation and entanglement swapping processes may be generalized to multipartite systems and with systems richer than qubits (quantum systems having more than two discrete orthogonal states, or even a continuum of states). This also applies to the invention, even though the following description is given in a context of qubits and entangled pairs for the sake of simplicity.

Figure 3:
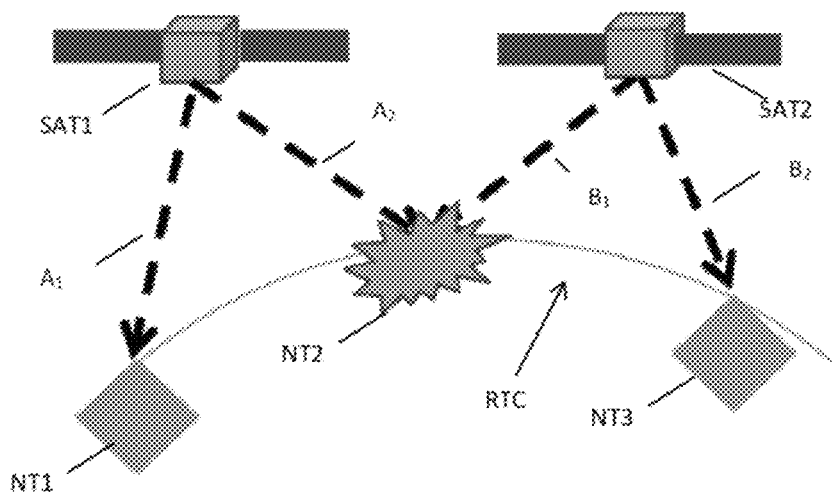
FIG. 3 illustrates the general structure and the operating principle of a quantum telecommunications network according to one embodiment of the invention.

FIG. 3 illustrates a basic principle of the invention in the case of a highly simple network comprising three ground nodes NT1, NT2, NT3 connected by a conventional telecommunications network RTC (wired, based on optical fibres, radio waves, etc.) and two satellites SAT1, SAT2 (this may in fact be just one and the same satellite considered at two different times), preferably in low Earth orbit. Each satellite transports a source of entangled photons, which may be transmitted to the ground nodes, which are equipped to detect them. The first satellite SAT1 sends a first photon $A_1$ of a first entangled pair to the first node NT1 and a second photon $A_2$ of the entangled pair to the second node NT2; the second satellite SAT2 sends a first photon $B_1$ of a second entangled pair to the second node NT2 and a second photon $B_2$ of the pair to the third node NT3. An entanglement swap between NT1 and NT3 via NT2 is therefore possible, as was explained above with reference to FIG. 2. The use of sources of pairs of entangled photons carried on board satellites makes it possible to establish a quantum link between nodes that may be very far apart from one another.

The on-board sources may transmit the pairs of entangled photons:
- either simultaneously to nodes that have to be visible simultaneously, if the satellite does not have an on-board quantum memory for storing entangled quantum states;
- or in a staggered manner if the satellite has such a memory, thereby making it possible to send entangled photons to nodes that are not necessarily visible simultaneously.

The ground nodes may:
- Either operate in (quasi) real time, and swap the entanglement on-the-fly between nodes to which they are connected. This assumes atmospheric conditions that allow the simultaneous propagation of the entangled states to the one or more nodes serving as repeaters and the end nodes that they connect.
- Or, preferably, have a quantum memory (for example based on $Eu_3^+:YSiO_5$) that makes it possible to store the received entangled-state elements and form an entanglement reserve, a resource to be consumed when the need to teleport is felt.

In the latter case, as will be explained in more detail with reference to FIG. 6, they may be equipped with an entanglement distillation device so as to maximize the level of entanglement of the states received from the orbiting source.

One important aspect of the invention is that the main resource of the network is formed by the stock of entangled states available to be swapped further or consumed by teleportation. Due to decoherence phenomena, it is necessary to take into account the fact that this resource is not only consumable but also perishable.

Figure 4:
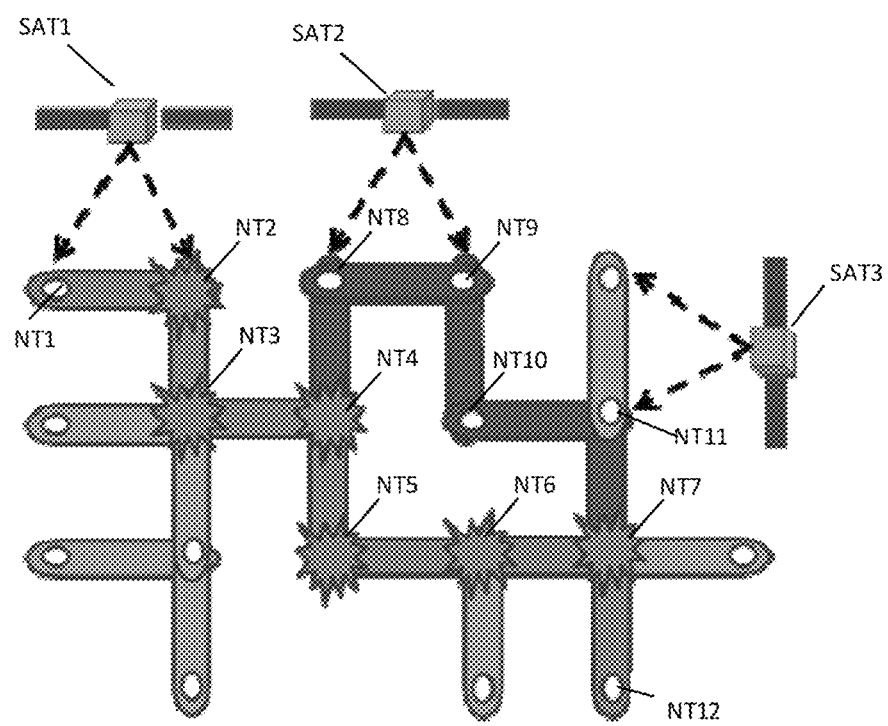
FIG. 4 illustrates the propagation of an entanglement link between two remote nodes of a quantum telecommunications network according to one embodiment of the invention.

FIG. 4 illustrates the use of this resource to create a quantum link between remote nodes. The figure shows an at least partially meshed network formed of elementary entanglement links, such as those between NT1 and NT2 and between NT2 and NT3 in FIG. 3. In the case of FIG. 4, there is therefore an elementary entanglement link (that is to say the sharing of an entangled pair) between NT1 and NT2, between NT2 and NT3, etc. It is noted that a node may form part of multiple elementary entanglement links: for example, the node NT4 shares a first entangled pair with NT3, a second entangled pair with NT5 and a third entangled pair with NT8. The pairs are distributed by the satellites SAT1, SAT2, SAT3.

To create an entanglement link between two non-adjacent nodes (that is to say nodes not connected by an elementary quantum entanglement link), it is necessary to identify at least one path formed of entanglement links. For example, to connect NT1 to NT12, a first path passing through NT2, NT3, NT4, NT5, NT6, NT7 and a second path passing through NT2, NT3, NT4, NT8, NT9, NT10, NT11, NT7 are identified. If, as in this case, multiple paths are identified, it is necessary to choose one thereof on the basis of one or more selection criteria, as will be discussed below.

In the example of FIG. 4, it is considered that it is the first path that is chosen. It is then necessary to propagate the entanglement link step-by-step using entanglement swapping operations. First of all, the node NT2 is used as repeater to create an entanglement link between NT1 and NT3; next, NT4 makes it possible to propagate the entanglement link to NT5; next, NT6 creates an entanglement link between NT1 and NT7. Since NT7 is adjacent to NT12, a last swapping operation creates an entanglement link between NT1 and NT12. This thus establishes a quantum channel between NT1 and NT12, which allows the direct transmission of a qubit between these two remote nodes. These operations are repeated for each qubit, where appropriate using different paths.

The entanglement swapping and teleportation operations require conventional information transmission, this being done by way of a conventional network (reference RTC in FIG. 3, not shown in FIG. 4) to which all of the nodes are connected.

It is important to note that each entanglement swapping or qubit transmission operation consumes an entanglement resource. These resources should therefore be constantly renewed by the sources on board the satellites.

Since the critical resource of a network according to the invention is the availability of entangled states between nodes, it is important to manage this in an optimum manner. The availability of the resource depends on 4 parameters:
  The consumption thereof by entanglement swapping or teleportation operations;
  The ageing thereof, for example due to decoherence of the resource that is created and not consumed;
  The visibility of sources on board satellites dedicated to renewing it; and
  The atmospheric conditions that may affect the renewal thereof.

Advantageously, therefore, the path followed to create an entanglement link between two remote nodes (that is to say nodes not sharing an entangled pair transmitted by a satellite) is therefore chosen taking into account:
  Schedules regarding the passage/presence of non-terrestrial platforms:
  Weather forecasts for each terrestrial repeater;
  The state of consumption of the resource on each elementary link;
  Swapping requirement statistics for the links.

For example, preference may be given to passing through nodes which, given the schedule regarding the passage of the satellites and weather conditions, will be rapidly replenished with entanglement resources. Likewise, knowing that an entanglement resource has a usage limit date beyond which it is considered to be excessively degraded due to decoherence, preference may be given to consuming resources close to their limit date rather than resources having a longer remaining lifetime. Moreover, preference will be given to using nodes that, on average, are less called upon. All of these various selection criteria may for example be weighted, so as to assign each possible path between two end nodes a "cost" to be minimized. This is a problem derived from that encountered in the field of observing the Earth in space, in which it is necessary to renew contacts with determined scenes.

The choice of the path to create a quantum channel between two remote nodes may be made in a centralized manner, by a computer controlling the whole network, or in a decentralized manner by computers associated with various nodes. In any case, the nodes have to transmit the state of their resources to the central computer and/or to the computers of the other nodes.

Recharging nodes with entanglement resources is advantageously scheduled based on their state of consumption and weather conditions forecast during future passages of the satellites.

Figure 5:
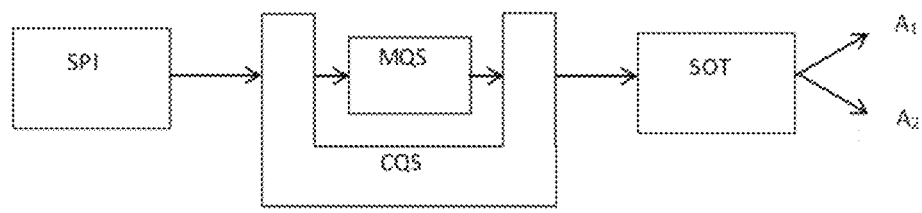
FIG. 5 is a basic diagram of the payload of a satellite able to be used to create a quantum telecommunications network according to one embodiment of the invention.

FIG. 5 schematically illustrates the structure and the operation of the quantum payload of a satellite able to be used in a network according to one embodiment of the invention.

The core of such a payload consists of a source of pairs (more generally, multiplets of quantum particles) in an entangled quantum state, SPI. These entangled quantum states may typically be photon polarization states, but electron or nuclear spin states, time/energy states, etc. may also be involved.

A quantum circuit CQS makes it possible to store the quantum states generated by the source SPI in a quantum memory MQS, for example of the type described by Zhong 2015 (nuclear spins) or Dréau 2018 (electron spins in NV centres), and to convert the states stored in the memory MQS into photons while retaining the entanglement relationships. For example, Dréau 2018 discloses conversion of electron spins in NV centres into photons in the near infrared. The entangled photons $A_1, A_2$ are then transmitted to the ground by an optical transmission system SOT, for example comprising one or more telescopes.

The use of a memory MQS and of the associated read/write quantum circuit CQS is not essential—it is also possible to directly transmit photons generated by the source SPI or obtained by on-the-fly conversion of the entangled states generated thereby. However, this requires the simultaneous transmission of two photons or more to different ground nodes with co-visibility. Using the memory makes it possible to use a single telescope to transmit, at different times, two entangled photons to nodes that do not necessarily have to be simultaneously visible to the satellite.

Figure 6:
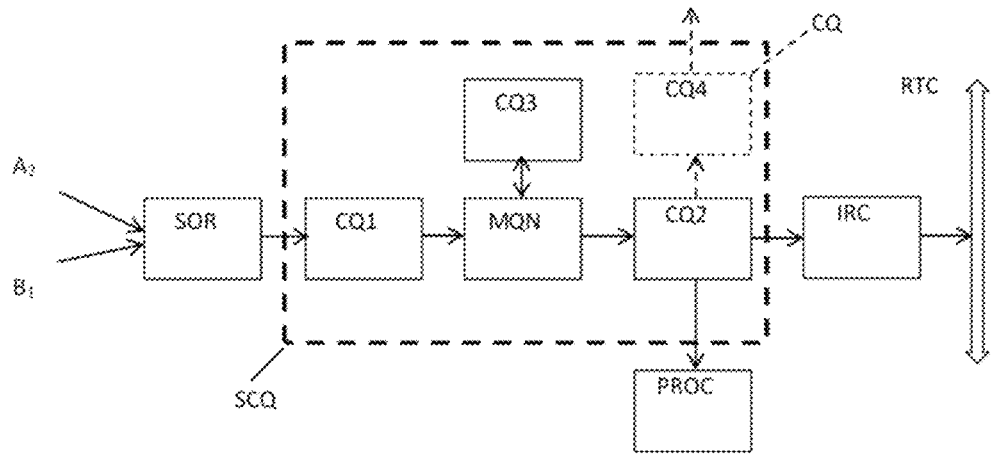
FIG. 6 is a basic diagram of a node of a quantum telecommunications network according to one embodiment of the invention.

FIG. 6 schematically illustrates the structure and the operation of a node of a quantum telecommunications network according to one embodiment of the invention.

The node comprises an optical receiver system SOR for receiving photons from satellites; this may be for example a telescope or a set of telescopes, having a fixed orientation or driven so as to follow the trace of one or more satellites during the passage thereof.

The collected photons are supplied at input to a quantum circuit system which, in the embodiment of FIG. 6, comprises:
  A quantum memory device MQN for storing quantum states.
  A first quantum circuit CQ1 for storing, in the memory MQN, the state of the collected photon, in other words for transferring the quantum state of the photon to a quantum state of a quantum subsystem of the memory.

A second quantum circuit CQ2 for taking a joint quantum measurement on the quantum states of two quantum subsystems of the quantum memory device, associated with respective photons. This quantum measurement—for example a Bell measurement—projects the measured quantum states onto a maximally entangled state base. This is the measurement that was described above with reference to FIG. 2 and that makes it possible to perform entanglement swapping. It will be noted that the joint measurement is not performed directly on the photons, but on subsystems of a quantum memory to which the quantum states of the photons have been transferred. Reference may therefore be made to an "indirect" joint measurement.

Optionally, a third quantum circuit CQ3 for applying a quantum distillation algorithm to a plurality of quantum subsystems of the quantum memory device. Quantum distillation is described, for example, in Kalb 2017. It should be noted that the quantum distillation circuits CQ3 of the various nodes have to exchange conventional information in order to make the distillation usable.

A—conventional—network interface circuit IRC makes it possible to transmit a result of the joint measurement taken by the second quantum circuit—which constitutes the conventional information—to other nodes of the quantum network via the conventional telecommunications network RTC.

Optionally, a computer processor PROC that is programmed opportunistically may be provided in order to verify a violation of Bell's inequalities by a series of said joint quantum measurements, so as to qualify the quality of the shared entanglement, and possibly to detect a confidentiality violation. The same or another processor may generally supervise the operation of the node.

It is important to note that all of the components of the node of FIG. 6 are known per se and able to be implemented using existing technologies. For example:

One possible embodiment of the first quantum circuit CQ1 and of the quantum memory MQN is described in Zhong 2015. In the node, the use of a memory having a high decoherence time is far more important than in the source on board the satellite.

One possible embodiment of the second quantum circuit CQ2 is described in Yang 2006.

One possible embodiment of the third quantum circuit CQ3 is typically an entanglement distillation (or purification) procedure as described in Bennet 1996 or a quantum error correction code procedure as used in quantum computers to form a pure logic qubit from multiple noisy physical qubits.

As a variant, the quantum memory (and therefore also the first and the third quantum circuit) may be absent. In this case, the second quantum circuit takes the joint measurement "on-the-fly" on photons that are received quasi-simultaneously.

The invention is not limited to the embodiments that have just been described; numerous variants are possible.

For example, the on-board source may generate multiplets of more than two entangled particles, thereby making it possible to create entanglement links between more than two nodes. Furthermore, as was explained above, the teleportation and entanglement swapping processes implemented in a network according to the invention may be generalized to multipartite systems and with systems richer than qubits (quantum systems having more than two discrete orthogonal states, or even a continuum of states).

Any sort of quantum state of photons or other particles or systems of particles may be used to form entangled multiplets: polarization states, coherent states, temporal or even hybrid states, etc.

Quantum states are transmitted between the satellites and the nodes using photons, but there is no limit with regard to their frequency/wavelength. For technological reasons (availability of the sources), however, it is preferable to use wavelengths in the near infrared and notably between 0.8 µm and 10 µm.

It is not necessary for all of the nodes to be located on the ground. Some nodes may for example be carried by satellites or aircraft.

As was explained above, the satellites may be replaced with airborne carriers, for example stratospheric probes or drones flying at high altitude.

One or more nodes of the quantum network may be connected to local or metropolitan networks so as to connect these (terrestrial) networks to the quantum network of the invention.

Furthermore, the quantum circuit system of at least one node may also have a fourth quantum circuit CQ4 (in dashed lines in FIG. 6) for directly transmitting the quantum state of a photon collected by the optical system SOC—or the state of a quantum subsystem of the quantum memory device MQN—on a quantum channel CQ. This channel may form part of a quantum network, and potentially extend over kilometres, or else have a length of a few metres or centimetres in order to connect a quantum computer, or any other quantum device, to a network according to the invention. Therefore, the network according to the invention makes it possible to interconnect quantum computers and/or other quantum networks, creating a true "quantum Internet".

The invention is not tied to any specific technology for producing the circuits and the quantum memories.

REFERENCES

Pirandola 2015: S. Pirandola, J. Eisert, C. Weedbrook, A. Furusawa, S. L. Braunstein "Advances In Quantum Teleportation", arXiv:1505.0783, 28 May 2015.

Yin 2020: Juan Yin et al. "Entanglement-based secure quantum cryptography over 1,120 kilometres", Nature volume 582, pages 501-505 (2020).

Zhong 2015: Manjin Zhong et al. "Optically addressable nuclear spins in a solid with a six-hour coherence time" Nature 517, 177-180, 8 Jan. 2015.

Bouwmeester 1997: Dik Bouwmeester et al. "Experimental quantum teleportation" Nature 390, 575 to 579, 11 Dec. 1997

Yang 2006: Tao Yang et al. "Experimental Synchronization of Independent Entangled Photon Sources" Phys. Rev. Lett. 96, 110501 (2006).

Dréau 2018: Anaïs Dréau et al. "Quantum frequency conversion to telecom of single photons from a nitrogen-vacancy center in diamond" arXiv:1801.03304v2 [quant-ph] 22 Jun. 2018.

Lago-Rivera 2021: Dario Lago-Rivera et al. "Telecom-heralded entanglement between multimode solid-state quantum memories" Nature, 2021, vol. 594, no 7861, p. 37-40.

Bennet 1996: C. H. Bennet et al. "Mixed-state entanglement and quantum error correction" Phys. Rev. A 54, 3824 (1996).

Kalb 2017: N. Kalb et al. "Entanglement distillation between solid-state quantum network nodes", Science, 356, 928-932 (2017).

The invention claimed is:

1. A quantum telecommunications network comprising:
   a plurality of at least three nodes (NT1-NT12), at least some of which are located on the ground;
   a conventional telecommunications network (RTC) connecting said nodes to one another; and
   at least one source (SPI) of multiplets of entangled photons and an optical transmission system (SOT), carried by a satellite (SAT1, SAT2) or by an airborne carrier and allowing the photons of said multiplets to be transmitted to respective nodes of said quantum telecommunications network in such a way that quantum entanglement links are established between pairs of multiplets of nodes forming a sub-graph covering said network;
   wherein each said node comprises:
      an optical reception system (SOR) for collecting photons originating from said or from one said source (SPI);
      a conventional network interface (IRC) for exchanging conventional information with other quantum telecommunications network nodes; and
      a quantum circuit system (SCQ) configured to take a direct or indirect joint quantum measurement on the quantum states of at least two photons collected by the optical system projecting them onto a base of maximally entangled states and to transmit the result of the joint quantum measurement to other quantum telecommunications network nodes via the conventional network interface; wherein
      in at least one said node, said quantum circuit system comprises:
         a quantum memory device (MQN) comprising a plurality of quantum subsystems;
         a first quantum circuit (CQ1) configured to transfer a quantum state of a photon collected by the optical reception system to a quantum subsystem of the quantum memory device; and
         a second quantum circuit (CQ2) configured to take said joint quantum measurement on the quantum states of at least two quantum subsystems of the quantum memory device that are associated with respective photons;
   the quantum telecommunications network further comprising:
   a central computer, or an interconnected network of computers associated with respective nodes, configured for determining one or more nodes, called intermediate nodes, such that the quantum entanglement links between these nodes form a path from a first node, called starting node, to a second node, called the end node, the starting node and the end note being not directly connected by a quantum entanglement link; the central computer or interconnected network of computers being further configured to control the quantum circuit systems (SCQ) of the intermediate nodes and the conventional telecommunications network to perform a succession of entanglement swapping operations between nodes so as to create a new quantum entanglement link between the starting node and the end node, allowing the quantum circuit systems of the starting node and end node and the conventional telecommunications network (RTC) to transmit a quantum state of the starting node to the end node.

2. The quantum telecommunications network according to claim 1, wherein the quantum circuit system of at least one said node also comprises a third quantum circuit (CQ3) configured to apply a quantum distillation algorithm to a plurality of quantum subsystems of the quantum memory device.

3. The quantum telecommunications network according to claim 1, wherein said or each said node (NT1-NT12) also comprises a processor (PROC) configured or programmed to verify a violation of Bell's inequalities by a series of said joint quantum measurements, so as to qualify the quality of the distributed entanglement.

4. The quantum telecommunications network according to claim 1, wherein the quantum circuit system (SCQ) of at least one said node is configured to transmit the quantum state of a photon collected by the optical system or a quantum subsystem of the quantum memory device on a quantum channel (CQ).

5. The quantum telecommunications network according to claim 1, wherein the multiplets are pairs of entangled photons.

6. The quantum telecommunications network according to claim 1, wherein the second quantum circuit of at least one said node is configured to take a Bell measurement on the quantum states of two quantum subsystems of the quantum memory device, resulting in entanglement swapping between two other nodes of the network.

* * * * *